May 21, 1935.  R. L. BARTON  2,002,135
ELECTRIC FISHING LURE
Filed July 22, 1930   2 Sheets-Sheet 1

INVENTOR.
Raymond L. Barton

May 21, 1935. R. L. BARTON 2,002,135

ELECTRIC FISHING LURE

Filed July 22, 1930 2 Sheets-Sheet 2

INVENTOR.

Raymond L. Barton

Patented May 21, 1935

2,002,135

UNITED STATES PATENT OFFICE 2,002,135

ELECTRIC FISHING LURE

Raymond L. Barton, San Diego, Calif.

Application July 22, 1930, Serial No. 469,759½

20 Claims. (Cl. 43—44)

My invention relates to fishing lures, important objects being to provide in conjunction therewith, internal illuminating means adapted to be energized at will; illuminating means adapted to be energized while submerged; illuminating means which may be energized by inertia; illuminating means which may shed its rays by simply energizing the lamp, or by shifting a sleeve through inertia to produce a flicker either by the rotation of the sleeve, or by bobbing the lure.

Simplicity of construction and ease in assembling of the component parts comprising the lure, is an important object.

An important object is the provision of a lure which is simple and easy to manufacture. Other important objects will be apparent as the description proceeds.

Figure 2:
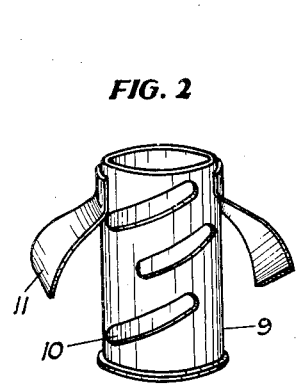
Figure 1:
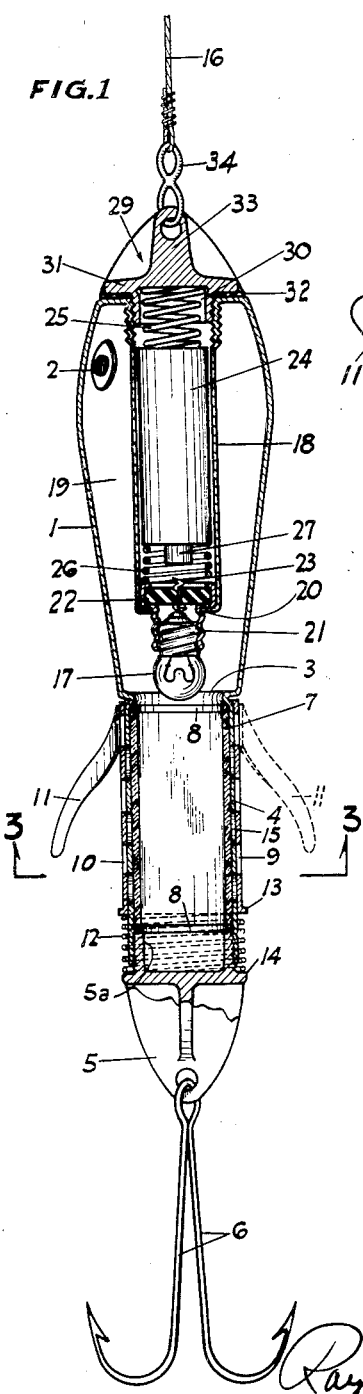
Figure 3:
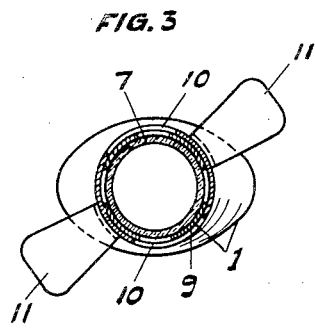
Figure 4:
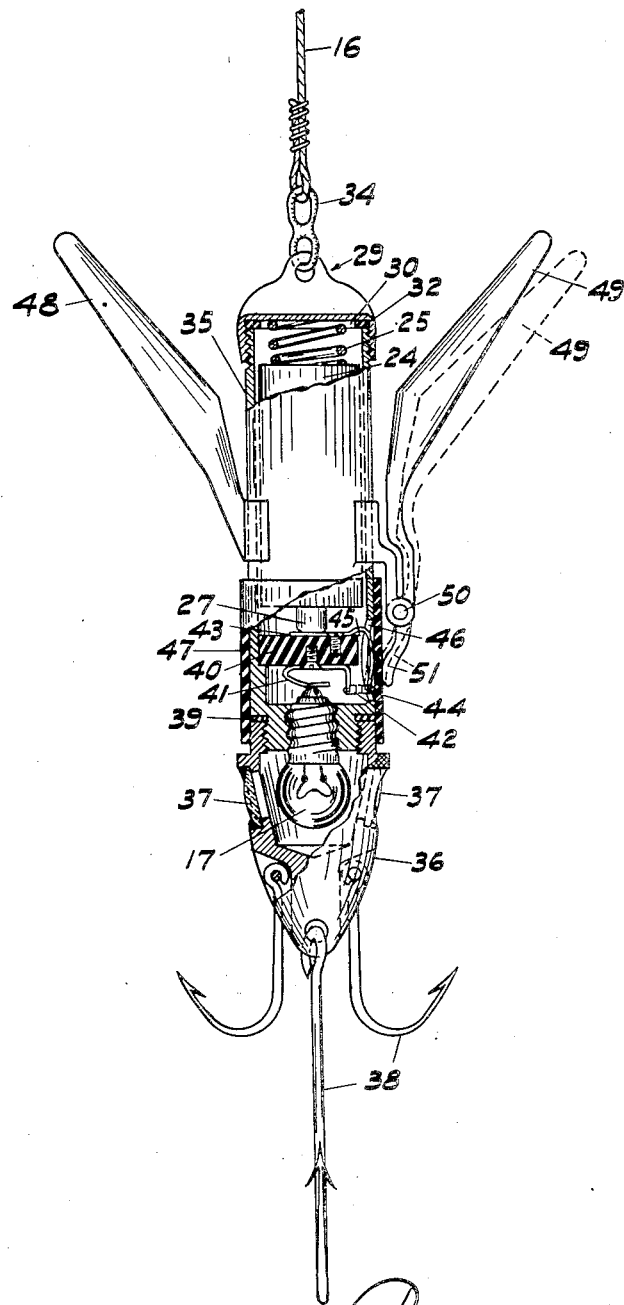

In the drawings complement to the specification, Fig. 1 is a longitudinal mid-section, Fig. 2 is a perspective view of the slidable and rotatable sleeve, Fig. 3 is a section taken on the line 3—3 of Fig. 1, and Fig. 4 is a longitudinal midsection and side elevation combined of an alternate constructed lure.

It is an established and well known fact among anglers that fish, especially game fish, have a peculiar affinity for light, and scintillating objects, which are known to lure where ordinary bait fails to attract.

My electric lure is far superior to ordinary lures or luminous baits by reason of its peculiar adaptation for night time fishing and for deep sea and roily waters.

Referring to the numeralized parts of the drawings, 1 is the outer casing or shell, translucent or otherwise, which is desirably patterned to simulate the streamline of a fish, 2 is one of the eyes which is preferably adapted to always emit light. The casing 1 is provided with an internally struck circumferential flange 3 and outwardly extended from said flange is a shutter consisting of an apertured cylindrical shell 4. Into the end of the cylindrical shell which is internally threaded for that purpose is screwed a tail piece 5, said tail piece being provided with a pair of twin hooks 6.

Internally mounted within the shell 4 is a colored glass tubing 7 held in fixed relation thereto with a rubber ring 8 placed at either end, the flange 3 limiting its movement at one end and the inturned flange 5a of the tail piece 5 limiting its movement at the other.

There is externally mounted on the shell 4 a rotatable and longitudinal displaceable sleeve 9. It is provided with spiral slots 10 and spiral vanes 11. The sleeve may be reciprocated by inertia by first overcoming the resistance of the spring 12 which normally prevents the lure from irradiating through that portion.

The spring 12 is seated between an out-turned flange 13 on the sleeve 9 and a similar flange 14 on the tail piece 5. When the sleeve 9 is in normal position, the innermost end is made to seat against the outside portion of the inturned flange 3 as shown.

There is provided windows 15 in the cylindrical body 4 arranged lengthwise thereof which are preferably of a diameter equal to the width of the spiral slots 10, and when the sleeve 9 is reciprocated to the full open position the windows 15 will register in part or whole with the slots 10.

As the lure is trowled or drawn by the line 16 the spiral vanes 11 under the impulse of the water, together with the inertia of the sleeve overcoming the resistance in the spring 12 will cause the sleeve to rotate and irradiate a scintillating light through the colored glass tubing as the sleeve is caused to move up and down and around and as the lure is bobbed.

The light irradiated is furnished from a glow lamp 17 the energizing of which, together with its co-related parts will now be described.

The casing 1 is inturned at one end to form a tubular battery enclosing receptacle 18, having a chambered space 19 there around.

The battery receptacle is provided with a flanged extremity 20 within which is mounted the removable lamp socket 21. Within said lamp socket 21 is crimped a hard rubber disc 22 through which extends, and to which is fastened a contact making spring 23.

Floatingly suspended within the battery receptacle 18 is an inertially reciprocable battery 24, said battery being suspendingly and floatably poised between springs 25 and 26.

Overcoming the resistance in the spring 26 by inertia of battery 24 causes electrode 27 to contact with spring 23 closing the circuit to the lamp. Simply jerking the line 16 will cause a bobbing of the battery which will intermittently close the circuit to the lamp, or by constant pull on the line 16 as in trowling and pulling the line in will cause a still longer energization of the lamp.

The rays from the lamp will illuminate the chamber 19 causing the eyes 2 or the body portion to irradiate light or the lure may be made more irridescent as hereinbefore set forth by shimmering the light through the windows 15.

Into the threaded expanded portion is screwed a head piece 29, said head portion being provided with a receptacle 30 in which the spring 25 is seated, and a flanged portion 31 which overlies the end of the casing 1, and under which is placed a rubber packing gland 32 whereby the battery cell is made water-proof.

Into the nose 33 of the head piece 29 is fastened a link 34 and to the link 34 is applied the line or leader 16.

The component parts appearing in Fig. 1 may be assembled as follows:

The glow lamp 17 is screwed within its socket and made to contact with spring 23. It is inserted through the end of the chamber 18 and allowed to rest on the flange 20. The spring 26 is next inserted, then the battery 18. The spring 25 is next put in place and finally the head piece 29 is screwed into the threaded end of the casing 1 after putting the packing gland 32 in place. The bulb may then be tested out.

The tail portion is then assembled. The upper rubber ring 8 is first installed, then the colored glass tubing 7 followed by the lower rubber ring 6. The freely slidable sleeve 9 is then mounted upon the cylindrical portion 4 followed by the insertion of the spring 12 thereagainst, and lastly the tail piece 5 is screwed snugly against the rubber piece 8 forcing the glass tubing in tight fitting relation with the upper rubber ring 8 making a watertight joint.

Referring to Fig. 4 the lure is bobbed by the use of a line or leader 16, fastened to a link 34, which in turn is fastened to the head piece 29. The head piece 29 is screwed to the battery end of the casing 35, it being provided with a socket 30 which is internally threaded for that purpose. Interposed between the two is a gasket 32.

The opposite end of the casing 35 is closed except for an opening into which is screwed the lamp 17.

That end is also reduced and threaded for the purpose of screwing thereonto a head light chamber 36, provided with glass windows 37, through which the rays of light from the lamp 17 are emitted.

There is a reflectory chamber around the lamp and the windows may be of various colors. To this head is also provided means onto which is fastened the hooks 38. There is a leak-proof rubber ring 39 interposed between the abutting faces of the casing and the head chamber. The hard rubber disc 40 is of segmental shape and is shelved within the casing 35 in juxtaposition with the protruding end of the lamp 17. On the underside of said disc is fastened an electric circuit closing spring 41 provided with a downwardly directed portion carrying a contact point 46 and on the upper side of said disc is fastened another circuit closing spring 43 in contact with the electrode 27 of the battery 24, which has a downwardly directed portion carrying a contact point 44, the opening 45 between the segmental disc 40 and the inner periphery of the casing permitting it to pass unobstructed downwardly there between.

In the hollow portion of the casing 35, between the segmental disc 40 and the head piece 29 is housed the battery 24, the electrode 27 of which rests on the spring 43 under the yielding action of the spring 25.

Adjacent to said opening 45 is another opening 46, in the wall of the casing 35, and round the casing and over said opening is provided a flexible rubber hose or jacket 47.

There are two spoon shaped fins fastened to the casing 35; a stationary fin 48 and a movable fin 49. The fin 49 is pivoted at 50 and has a tongue portion 51, which bears against that portion of the rubber hose or jacket which covers the hole 46, whereby to depress the spring carrying control point 44, so as to engage it with the contact point 42, thus closing the circuit to the lamp. This action results from jerking the lure. It causes the fin 49 to move from full to dotted position, which is the position assumed when the circuit to the lamp is closed, or the action of the fin against the water as the lure is trowled will also cause the fin to be moved from full to dotted position, thereby constantly closing the circuit to the lamp, or in deep sea fishing at great depths the pressure alone may act upon the jacket 47 to close the contact points and the lamp be automatically energized.

In this specification and drawings I have shown a preferred embodiment and an alternate specie, the descriptive sense appertaining to the latter being generic to the former as shown by the scope of the invention set forth in the appended claims.

I claim:

1. An electric fishing lure simulating a fish having a body portion, and a tail portion, a lamp and a battery normally disengaged in said body portion, a colored glass cylindrical chamber contained in said tail portion forming a water tight compartment therewith, a sleeve slidable over said tail portion and containing windows, and windows in said tail portion registering with said windows in said sleeve for emitting light from said lamp.

2. An electric fishing lure simulating a fish having a body portion, and a tail portion, a lamp and a battery normally disengaged in said body portion, a colored glass cylindrical chamber contained in said tail portion forming a water tight compartment therewith, a sleeve slidable over said tail portion and containing windows, and windows in said tail portion registering with said windows in said sleeve for emitting light from said lamp, said sleeve being equipped with spiral vanes whereby said sleeves may be rotated to flicker the light thus emitted.

3. In a fishing lure, a submergible casing, a lamp therein, said casing having a tubular portion provided with windows, a freely slidable sleeve fitted over said tubular portion, said sleeve having lateral openings adapted to be moved into and out of register with said windows when said sleeve slides back and forth upon the aforesaid tubular portion of the casing, a spring tending to slide said sleeve to a position wherein it closes said windows, and means to suddenly move said lure to slide said sleeve to window-opening position against the opposition of said spring.

4. In a fishing lure, a submergible casing, a lamp therein, said casing having a tubular portion provided with windows, a freely slidable sleeve fitted over said tubular portion, said sleeve having lateral openings adapted to be moved into and out of register with said windows when said sleeve slides back and forth upon the aforesaid tubular portion of the casing, a spring tending to slide said sleeve to a position wherein it closes said windows, and means to suddenly move said lure to slide said sleeve to window-opening position against the opposition of said spring, said spring being coiled about the tubular portion of said casing and having one end thereof in engagement with an end of said sleeve.

5. In a fishing lure, a casing having windows in the wall thereof and a tubular battery receptacle contained therein, a battery fitted within said receptacle and adapted to move freely therein, a lamp within said casing, said battery and lamp being provided with terminals and said battery being movable toward said lamp to cause said terminals to engage each other to energize said lamp, and a spring tending to move said battery and lamp away from each other.

6. In a fishing lure, a casing simulating a fish, said casing having a glazed light opening simulating an eye of the fish, a portion of said casing remote from said eye being provided with other glazed light openings, means controlled by inertia to open and close the latter light openings automatically when the lure is bobbed, and lighting means within the lure located between said eye simulating light opening and the last mentioned light openings.

7. In a fishing lure, a casing containing a battery receptacle, having opposing springs therein, a battery floatingly suspended within said receptacle between said springs to permit it to move relatively to said casing as the lure is bobbed, said battery being provided with a terminal which moves therewith, and a lamp normally mounted within said casing out of circuit conducting relation with said battery and having a terminal positioned to be engaged and disengaged by the terminal of said battery as said battery is longitudinally displaced in said casing by the manual bobbing or trolling of the lure, said casing having windows to emit light from said lamp.

8. In a device of the class described, the combination of a plurality of members two of which are relatively movable with respect to a third, one of said movable members being movable externally and the other internally with respect to said third member, means whereby said movable members are floatably mounted with respect to said third member, and a lamp within said third member engageable by one of said movable members, the rays of which are emitted thru openings in the externally moving member and said third member and shimmered by the other of said movable members.

9. In a fishing tackle, a lure simulating a fish comprising in combination a body portion and a tail portion, eyes in said body portion and a colored tube in said tail portion, said tail portion being provided with a plurality of openings for emitting light therethrough, a rotatable sleeve containing spiral windows located exteriorily of said tail portion and provided with fins, said lure being adapted to be manually bobbed whereby to rotate said sleeve to scintillate the light emitted through said openings and said spiral vanes and a primary source for said light.

10. An artificial bait comprising a submergible casing having a light opening through the wall thereof, a lamp within said casing, a floatable battery normally out of circuit conducting relation in juxtaposition with said lamp, and means dependent upon the jerking of the line, to oscillate said battery while submerged to intermittently energize said lamp at will whereby to intermittently radiate light through said opening and tantalize a fish to strike thereat.

11. An electric fishing lure comprising a casing having a battery and lamp enclosed therewith, said battery and lamp being normally disengaged, a window in said casing and means operable by jerking a line to engage, disengage and re-engage the battery in circuit closing relation within said lamp.

12. In a fishing lure, a casing containing a receptacle in spaced relation to the walls thereof to provide a chamber therearound, there being a glazed opening in said casing, a lamp mounted in the end of said receptacle and yieldably poised means reciprocably mounted in said receptacle adapted upon jerking a line to make contact with said lamp to emit light through said opening.

13. In a fishing lure, a casing, a lamp and a battery normally unattached to said lamp within said casing, said casing having windows in the wall thereof, an oscillatory shutter operable by bobbing the lure to flicker the light emitted through said windows and means controlled by jerking the line to close the circuit from said battery to said lamp.

14. In a fishing lure, a casing, a lamp and a battery normally unattached to said lamp within said casing, said casing having windows in the wall thereof, an oscillatory shutter mounted rearwardly of said casing and containing spiral vanes operable by bobbing the lure to flicker the light emitted through said windows, and means controlled by jerking the line to close the circuit from said battery to said lamp, said shutter being provided with fins.

15. In a fishing lure, a casing, a lamp and a battery normally unattached to said lamp within said casing, said casing having windows in the wall thereof, an oscillatory shutter operable by bobbing the lure to flicker the light emitted through said windows, means controlled by jerking the line to close the circuit from said battery to said lamp, and yielding means tending to maintain said shutter in a position wherein it covers said windows.

16. In a fishing lure, a submergible casing having a light opening through the wall thereof, an electric lamp within said casing, and a fore and aft spring-supported battery within said casing positioned to be moved when the casing is oscillated to and from a position to energize said lamp.

17. In an electric fishing lure, a lamp, and a battery mounted therewithin for relative movement; a line attached to said lure whereby to retract the same to cause relative movement of the battery and lamp to close the circuit to the lamp; and automatic means for disrupting the circuit.

18. A submergible electric fishing lure having an electric lamp, a battery therein, a wing pivotally attached to said lure and operable by bobbing the lure for closing the circuit from the battery to the lamp.

19. In an electric fishing lure having an electric lamp and a battery arranged therewithin, a spring tending to normally keep the battery and lamp out of circuit conducting relation with each other, and means to manually bob the lure whereby to close the circuit to the lamp against the opposition of said spring.

20. In a fishing lure having a side wall provided with windows, an electric lamp within the lure, a battery for the lamp, said windows being positioned for visibility from the exterior when illuminated by said lamp, and motion resisting means upon the exterior of the lure for controlling the emission of light therefrom, said means comprising a movable wing.

RAYMOND L. BARTON.